United States Patent [19]
Ripley

[11] 3,951,924
[45] Apr. 20, 1976

[54] RESIN DERIVATIVES
[75] Inventor: Ian Stanley Ripley, Stockton-On-Tees, England
[73] Assignee: Imperial Chemical Industries Limited, London, England
[22] Filed: Sept. 3, 1974
[21] Appl. No.: 502,880

[30] Foreign Application Priority Data
Sept. 7, 1973   United Kingdom............... 42174/73

[52] U.S. Cl............................. 260/878 R; 260/96 R; 526/15; 526/20; 526/26; 526/47; 526/56; 526/290; 526/317
[51] Int. Cl.² ..................... C08D 3/04; C08D 5/02
[58] Field of Search................... 260/78.4 D, 94.7 A

[56] References Cited
UNITED STATES PATENTS

| | | | |
|---|---|---|---|
| 2,649,439 | 8/1953 | Brown | 260/89.5 |
| 3,404,134 | 10/1968 | Rees | 260/78.5 |
| 3,609,111 | 9/1971 | Kumanotani | 260/78.4 D X |
| 3,644,248 | 2/1972 | Luijk et al. | 260/78.4 D |

Primary Examiner—William F. Hamrock
Attorney, Agent, or Firm—Cushman, Darby & Cushman

[57] ABSTRACT

Group II metal salts of the reaction product of a petroleum resin with an alpha, beta-ethylenically unsaturated acid or anhydride are prepared by reacting the reaction product, which contains free carboxyl groups, with a Group II metal compound in the presence of a lithium compound as catalyst.

10 Claims, No Drawings

RESIN DERIVATIVES

The present invention relates to resin derivatives, in particular to petroleum resin derivatives.

Petroleum resins are produced by polymerising a $C_5$ stream with the aid of a Friedel Crafts catalyst such as aluminium chloride or boron trifluoride. The $C_5$ stream which is derived from a steam cracked hydrocarbon such as naphtha or gas oil typically boils in the range $-10°$ to $80°C$, and commonly contains $C_5$ olefines or di-olefines such as pentene-1, cyclopentene, methylbutenes, isoprene, piperylene etc. Some $C_4$ olefines may also be present. The petroleum resin which is obtained is an amorphous material with a softening point in the range $80°$ to $130°C$.

Petroleum resins contain residual olefinic unsaturation which enable them to be reacted with other olefinically unsaturated compounds and, in particular, with alpha-beta-ethylenically unsaturated aliphatic mono- or dicarboxylic acids or their anhydrides, e.g. with maleic anhydride. The result is a resin (hereinafter referred to as "carboxylated resin") which possesses carboxyl or carboxylic acid anhydride groups and which is capable of reaction with a metal compound to give the corresponding metal derivative.

The derivatives with the metals of Group II of the Periodic Table according to Mendeleef find use in gravure ink formulations in which they are blended with a solvent and a pigment. Gravure inks represent a large tonnage usage so there is every incentive to devise an effective process for preparing the Group II metal salts.

The temperature at which the carboxylated resin may be reacted with the Group II metal compound lies between $200°$ and $300°C$. At the lower limit the mixture is too viscous for effective mixing and at the higher temperature the carboxylated resin starts to degrade. Unfortunately, however, the reaction is slow at the lower temperatures and so on a commercial scale it is necessary to operate at the higher temperatures with consequent risk of decomposition.

We have now found a catalyst which speeds up the reaction so that it may be carried out commercially at the lower temperatures or at the higher temperatures for a shorter time.

According to the invention a salt of a carboxylated resin as defined herein and a metal of Group II of the Periodic Table is produced by reacting the carboxylated resin and a compound of the Group II metal in the presence of a lithium compound as catalyst.

The carboxylated resin which is the starting material for the process of the present invention is derived from a petroleum resin by reaction with an alpha-beta-ethylenically unsaturated aliphatic mono- or dicarboxylic acid or the anhydride of such a dicarboxylic acid, particularly with maleic anhydride. In general the acid may contain up to 10 carbon atoms, e.g. acrylic, methacrylic, maleic, itaconic, mesaconic or citraconic acid. The reaction with the unsaturated acid or anhydride is preferably carried out in the liquid phase under an oxygen-free atmosphere at a temperature in the range $150°$ to $300°C$, preferably $200°$ to $250°C$. The amount of unsaturated acid or anhydride used is preferably 2 to 40% by weight of the petroleum resin.

The Group II metals to which the process is particularly applicable are calcium and zinc, although strontium, barium and cadmium may also be used. The compound of the Group II metal is suitably a salt, particularly a halide, carbonate, bicarbonate, a salt of an alkanoic acid containing 1 to 20 carbon atoms, e.g. acetate or stearate, or a salt of an aromatic acid, e.g. benzoate or a cycloaliphatic acid, e.g. naphthenate. The oxide or hydroxide of the metal may also be used.

The lithium compound may similarly be derived from a wide variety of anions. Although the halide, e.g. the chloride or bromide is preferred, lithium carbonate, hydroxide, bicarbonate or a lithium salt of an alkanoic acid containing 1 to 20 carbon atoms, e.g. lithium acetate may also be used. The lithium cation is the important part of the catalyst and surprisingly is far more effective than such closely analogous cations such as sodium.

The process of the invention is suitably carried out between $200°$ and $300°C$, preferably $250°$ and $290°C$, particularly $250°$ and $275°C$. The amount of Group II metal compound used is based on the proportion of alpha-beta-unsaturated acid or anhydride in the resin and is suitably 5 to 100, preferably 5 to 45, more preferably 10 to 30 mole percent of the latter. The weight of catalyst is suitably 0.1 to 20%, more preferably 3 to 10% by weight of the Group II metal compound.

The reaction time is generally up to 10 hours, e.g. 1 to 5 hours and the end of the reaction may be estimated by acid value determinations but is also reflected in the softening point of the product, as high a softening point as possible being desirable for the use of the product in gravure inks. For this purpose no purification of the reaction product is required and the mixture is simply cooled down, the resulting resin then being suitable for ink blending operations.

The invention will now be further described with reference to the following Examples.

EXAMPLES

200 Grams of a sample of a commercial petroleum resin sold under the name IMPREZ (IMPREZ is a trademark) were melted under a nitrogen atmosphere with constant stirring and were then heated up to $200°C$. Solid maleic anhydride was next added to the molten resin in eight equal portions spread over two hours. In total 30 grams of maleic anhydride were added. The resin so produced had a softening point of $136°C$.

200 Grams of the "maleinised resin" produced as above was heated in a 500 ml. round-bottomed flask fitted with a Dean and Stark head, a stirrer, a nitrogen bleed and a thermometer with approximately 2 grams calcium hydroxide (10 mole % based on the maleic anhydride content of the resin) and 0.1 grams of lithium chloride (5% by weight of the calcium hydroxide). The reaction temperature was $275°C$ and the time of reaction 3 hours.

During the reaction samples were taken from the flask and their softening point, acid value and hot melt viscosity at $200°C$ determined.

The experiment was repeated changing the catalyst but otherwise maintaining the same reaction conditions. The results are given in the following Table.

| Example | Catalyst | Softening Point | | | Acid value mgm KOH/g. | | | Hot melt viscosity (poise) | | |
|---|---|---|---|---|---|---|---|---|---|---|
| | | 1 hr. | 2 hrs. | 3 hrs. | 1 hr. | 2 hrs. | 3 hrs. | 1 hr. | 2 hrs. | 3 hrs. |
| 1 | none | 136°C | 136°C | 136°C | 72 | 67 | 67 | 24 | 24 | 20 |
| 2 | LiCl | 141°C | 153°C | 160°C | 45 | 43 | 17 | 32 | 40+ | 40+ |
| 3 | LiBr | 138°C | 154°C | 161°C | 51 | 44 | 19 | 23 | 40+ | 40+ |
| 4 | LiOH | 138°C | 146°C | 154°C | 63 | 51 | 45 | 29 | 40+ | 40+ |
| 5 | Ca acetate | 132°C | 136°C | 136°C | 52 | 47 | 43 | 21 | 21 | 23 |
| 6 | CaCl$_2$ | 138°C | 147°C | 149°C | 49 | 45 | 44 | 37 | 40+ | 40+ |
| 7 | NaCl | 134°C | 136°C | 144°C | 67 | 54 | 50 | 21 | 20 | 40 |

I claim:

1. In a process for the production of a salt of a carboxylated petroleum resin and a compound of a metal of Group II of the Periodic Table, which comprises reacting in the liquid phase a petroleum resin with an alpha, beta-ethylenically unsaturated aliphatic dicarboxylic acid or the anhydride thereof with, and the resulting carboxylated petroleum resin is reacted with a Group II metal compound, to form a salt, the improvement which comprises reacting said carboxylated resin and Group II metal compound in the presence of a lithium cation as a catalyst.

2. A process as claimed in claim 1 in which the carboxylated resin is the reaction product of a petroleum resin with maleic anhydride.

3. A process as claimed in claim 1 in which the Group II metal compound is a salt, oxide or hydroxide.

4. A process as claimed in claim 1 in which the catalyst is derived from a lithium compound selected from the group consisting of a lithium halide, carbonate, bicarbonate, hydroxide or lithium salt of an alkanoic acid containing 1 to 20 carbon atoms.

5. A process as claimed in claim 1 in which the amount of Group II metal compound is 5 to 45 mole % of the proportion of alpha-beta-unsaturated acid or anhydride in the carboxylated resin.

6. A process as claimed in claim 1 in which the weight of catalyst used is 1 to 20% by weight of the Group II metal compound.

7. A process as claimed in claim 1 in which the temperature is 200° to 300°C.

8. A process as claimed in claim 1 for the production of a calcium or zinc salt of the reaction product of a petroleum resin and maleic anhydride which comprises reacting said reaction product with a calcium or zinc oxide, hydroxide or salt in the presence of a lithium salt as catalyst.

9. A process as claimed in claim 1 in which the Group II metal compound is calcium or zinc salt selected from the group consisting of a halide, carbonate, bicarbonate, alkanoate of an alkanoic acid containing 1 to 20 carbon atoms, a salt of an aromatic acid and a salt of a cycloaliphatic acid.

10. A process as claimed in claim 9 in which the catalyst is a lithium salt selected from the group consisting of halide, carbonate, bicarbonate, hydroxide and alkanoate of an alkanoic acid containing 1 to 20 carbon atoms.

* * * * *